United States Patent

Wyke

[15] 3,640,221
[45] Feb. 8, 1972

[54] PLANOGRAPHIC PRINTING PLATE

[72] Inventor: Edward R. Wyke, Chelmsford, Mass.

[73] Assignee: Litton Business Systems, Inc., New York, N.Y.

[22] Filed: Feb. 11, 1970

[21] Appl. No.: 10,634

[52] U.S. Cl. ............................ 101/453, 117/152, 101/460, 101/462
[51] Int. Cl. .................................. B41n 1/00, B41n 3/00
[58] Field of Search ............... 117/152; 101/460, 462, 458, 101/453

[56] References Cited

UNITED STATES PATENTS

| | | | |
|---|---|---|---|
| 2,542,784 | 2/1951 | Van Dusen | 101/460 |
| 2,814,988 | 12/1957 | Bradstreet et al. | 101/458 |
| 2,964,403 | 12/1960 | Beekman et al. | 117/152 X |
| 3,169,865 | 2/1965 | Wood | 117/152 X |
| 3,254,597 | 6/1966 | Hart et al. | 101/462 |
| 3,455,241 | 7/1969 | Perkins | 101/462 X |
| 3,508,952 | 4/1970 | Eykamp | 117/152 X |
| 3,557,696 | 1/1971 | Hoover et al. | 101/462 X |

Primary Examiner—David Klein
Attorney—Norman Friedman, Stephen E. Feldman, Morris I. Pollack, Arthur T. Groeninger and Philip Furgang

[57] ABSTRACT

A planographic printing plate comprising a base having adhered thereto an insolublized coating, including a pigment mixture containing zirconium silicate so as to enhance rejection of ink in nonimaged areas of the plate 2 Claims, No Drawings

PLANOGRAPHIC PRINTING PLATE

BACKGROUND OF THE INVENTION

Planographic printing plates are made by applying to a base web or sheet a coating having, among other things, desirable hydrophilic-oleophilic properties whereby a greasy composition may be retained, to form an ink-receptive image, and an aqueous etch or fountain solution may be retained by the remainder of the plate to form an ink-repellent surface. Such plates may be mounted on a roller of an offset printing press, for example, and caused to pass successively in contact with a fountain solution and a printing ink. Ideally, the ink is totally rejected by the plate due to the fountain solution, except for the imaged areas thereof to which the ink adheres due to the absence of the fountain solution. The inked image is then transferred to a blanket, for image reversal, and applied to the sheet to be printed.

In the past, the ink has not been completely rejected in the nonimaged areas.

BRIEF DESCRIPTION

Broadly, the improved planographic printing plate of this invention is prepared by forming an aqueous coating composition comprising a novel clay pigment mixture including zirconium silicate. Conventional components in the composition include, an adhesive, a cross-linking agent for the adhesive and hydrochloric acid. The acid is added so as to enhance the curing of the adhesive, which tends to cure better at a pH range of 3.5 to 5.5. This aqueous coating composition is then applied in conventional manner to the surface desired, usually a wet strength paper web, and the coating dried, advantageously at a pH of about 4 to 6.5 to form an insoluble planograph coating.

DETAILED DESCRIPTION

Various known coating grades of filler clays can be used to form the pigment mixture according to this invention. Clays of small particle size are preferred since they seem to produce better results. Some examples of clays which can be used include various types of kaolin or china clays, Lustra Clay and so forth. Lustra Clay, marketed by the Southern Clay Company, has been found to be particularly advantageous. No. 1 Hydrofine, marketed by Georgia Koalin Company has also been found to be particularly advantageous.

The zirconium silicate utilized should have a particle size less than 40 microns and preferably less that 4 microns. There is no lower limit as the smallest particles commercially available, i.e., 0.15 microns has proved feasible. The ratio of clay to zirconium silicate may vary widely from about 20 to 1 to about 1 to 1, depending upon the properties desired in the finished plate.

Although it is preferred to use a clay along with the zirconium silicate in the pigment mixture, other pigments may be used in place of, or in addition to, the clay, such as calcium silicate, barium sulfate, titanium dioxide, etc.

If desired, dispersing agents may be employed along with these pigment mixtures, such as sodium hexametaphosphate, disodium dihydrogen pyrophosphate, tetrapostassium pyrophosphate, tetrasodium pyrophosphate, etc.

Polyvinyl alcohol is preferably used as the adhesive. The higher the molecular weight and the greater the polyvinyl alcohol is hydrolized, the greater the ease of insolubilization. Polyvinyl alcohol is generally obtainable and applied in aqueous solution. Various commercial grades are suitable for the purpose, such as Elvanol manufactured by E. I. du Pont de Nemours and Company.

There is an optimum ratio of pigment mixture to adhesive and experiments indicate that overall the pigment/adhesive ratio should preferably be between about 9 to 1 and 4 to 1.

Advantageously, the cross-linking agent used in the composition is glyoxal, and the ratio of the cross-linking agent to the adhesive may advantageously be from approximately 10 to 70 percent, and preferably 35 percent, based on the adhesive.

Other suitable cross-linking agents can be used, such as ureaformaldehyde, N,N'-ethylene dimethylol cyclic urea, dimethylol urea, other dialdehydes, etc.

Zinc acetate may be added. This enters the pores and the interstices existing among adjacent particles of mineral pigment in coating, and after evaporation of the aqueous vehicle the dry but still soluble salt remains deposited and partially fills the pores and interstices. When the surface is subsequently treated with an aqueous lithographic wetout of fountain solution which contains an ingredient capable of reacting with said soluble zinc acetate to form a less soluble or insoluble compound, such as an insoluble or slightly insoluble compound of the zinc acetate, is formed inside of the pores and interstices of the coating. The insoluble or slightly soluble multivalent zinc acetate compound so formed acts to plug the pores and interstices and to a considerable extend prevents or decreases further penetration of the surface by the lithographic solution. The optimum ratio of zinc acetate should preferably be between about 5 to 15 percent of the total solids present in the coating.

The hydrochloric acid is added to the composition in sufficient quantity to bring it down to a pH range of 3 to 5.5. Hydrochloric acid may be added to the composition prior to the addition of zirconium silicate and/or zinc acetate.

If desired, a plasticizer such as glycerin may be added to the composition so as to enhance the flexibility of the plate.

The following examples illustrate the manner of preparing the improved planographic plates of this invention in more detail. The following coating composition mixtures were prepared and coated on a base paper and dried. The resulting planographic printing plates had low water absorbency and possessed an excellent hydrophilic-oleophilic balance, permitting good image adherence and good image life while at the same time permitting good water retention. These plates produced clean copy, good toning, and possessed good image, correction of life, and stop-go properties. Parts are by weight, zirconium silicate had a particle size ranging from 0.15 to 4 microns.

|  | A | B | C | D |
|---|---|---|---|---|
| Lustra Clay | 100 | 89 | 78 | 111 |
| Polyvinyl Alcohol | 12.2 | 12.2 | 12.2 | 12.2 |
| Zirconium Silicate | 11.1 | 22 | 32 | 0 |
| Glyoxal | 1.5 | 1.5 | 1.5 | 1.5 |
| Zinc acetate | 7.8 |  | 7.8 | 7.8 |

In each of the above, the clay and zirconium silicate are added to water to form a 50 percent solid dispersion. A 10 percent aqueous solution of polyvinyl alcohol is then added to the pigment dispersion. Acid was then added to provide a pH 0.2 to 5.5. A 40 percent aqueous solution of glyoxal was then added followed by the addition of a 20 percent solution of zinc acetate.

Tests of sheets prepared according to the above indicated that the proportions listed in mixtures A, B and C were best. Mixture D had poor press characteristics due to background tone. Mixtures A, B, and C greatly improved background cleanliness. Mixture C provided best performance.

The coating composition may be applied to the base web sheet by conventional apparatus, such as air knives or roll coaters. The amount of coating may vary from about 5 to 20 lb. per 3,300 sq. ft. After coating, the stock is dried and cured at a suitable temperature. Temperature as low as 120° F. and as high as 320° F. have been used. The curing time will vary directly with the amount of heat applied. The coating composition is self-insolubilizing and the components react during the drying/curing cycle to produce a practically water-impervious film, which possesses excellent properties of accepting and holding both water and greasy ink.

While preferred embodiments of the invention have been shown and discussed, it should be understood that various changes and modifications may be resorted to, within the scope of the invention as defined by the appended claims.

What is claimed is:

1. A planographic printing plate comprising a base and a coating thereon having a planographic printing surface, said surface comprising a pigment mixture and the reaction product of a hydrophillic colloidal adhesive and a cross-linking agent, said pigment mixture containing zirconium silicate.

2. The planographic printing plate of claim 1, in which the zirconium silicate has a particle size of between 0.15 and 4 microns.

* * * * *